United States Patent [19]

Furuse et al.

[11] Patent Number: 5,283,473

[45] Date of Patent: Feb. 1, 1994

[54] MEMORY DRIVE POSITIONING APPARATUS FOR SEAT OR STEERING WHEEL SHAFT

[75] Inventors: Takahisa Furuse; Mitsuo Yokoyama, both of Yokohama, Japan

[73] Assignee: Jidosha Denki Kogyo Kabushiki Kaisha, Yokohama, Japan

[21] Appl. No.: 783,105

[22] Filed: Oct. 25, 1991

[30] Foreign Application Priority Data

Oct. 26, 1990 [JP] Japan ................... 2-290547

[51] Int. Cl.$^5$ ............................................. G05B 19/42
[52] U.S. Cl. ................................. 307/10.6; 307/10.1; 364/424.05
[58] Field of Search ............... 307/10.1, 10.6; 364/424.05; 200/52 R, 18, 5 R, 61.54; 318/445–452, 484, 266, 286, 466–469, 434

[56] References Cited

U.S. PATENT DOCUMENTS

| | | | |
|---|---|---|---|
| 4,503,504 | 3/1985 | Suzumura et al. | 364/424.05 |
| 4,689,537 | 8/1987 | Mizuta et al. | 318/466 |
| 4,698,571 | 10/1987 | Mizuta et al. | 318/466 |
| 4,728,873 | 3/1988 | Inoue et al. | 318/466 |
| 4,775,939 | 10/1988 | Nakashima et al. | 364/424.05 |
| 4,853,687 | 8/1989 | Isomura et al. | 318/466 |
| 4,922,426 | 5/1990 | Obara et al. | 364/424.05 |
| 5,128,500 | 7/1992 | Hirschfeld | 200/5 R |
| 5,164,645 | 11/1992 | Furuse et al. | 318/266 |

*Primary Examiner*—A. D. Pellinen
*Assistant Examiner*—Richard T. Elms
*Attorney, Agent, or Firm*—Sughrue, Mion, Zinn, Macpeak & Seas

[57] ABSTRACT

A drive positioning apparatus which comprises at least one motor for driving a seat or a steering wheel shaft, a preset memory for memorizing operating data of the motor, a memory drive circuit for actuating the motor automatically according to the memorized data, a manual switch for actuating the motor manually, an ignition switch provided with a KEY contact, an IGN contact and an ACC contact for supplying electric power to electrical equipment which is so structured as to change to its OFF-state interlockingly by an ON-operation of a ST contact used for actuating an engine starter motor, and a control mechanism for prohibiting the automatic actuation of the motor in a case where predetermined time elapses after the ACC contact changes to the OFF-state from its ON-state while the motor is being actuated automatically.

6 Claims, 7 Drawing Sheets

MEMORY DRIVE POSITIONING APPARATUS FOR SEAT OR STEERING WHEEL SHAFT

BACKGROUND OF THE INVENTION

1. Field of the Invention

This invention relates to a drive positioning apparatus used for driving a seat and/or steering wheel of, for example, an automotive vehicle back and forth, up and down, and so on, and for positioning them automatically in memorized positions suitable for a driver or drivers.

2. Description of the Prior Art

Figure 5:
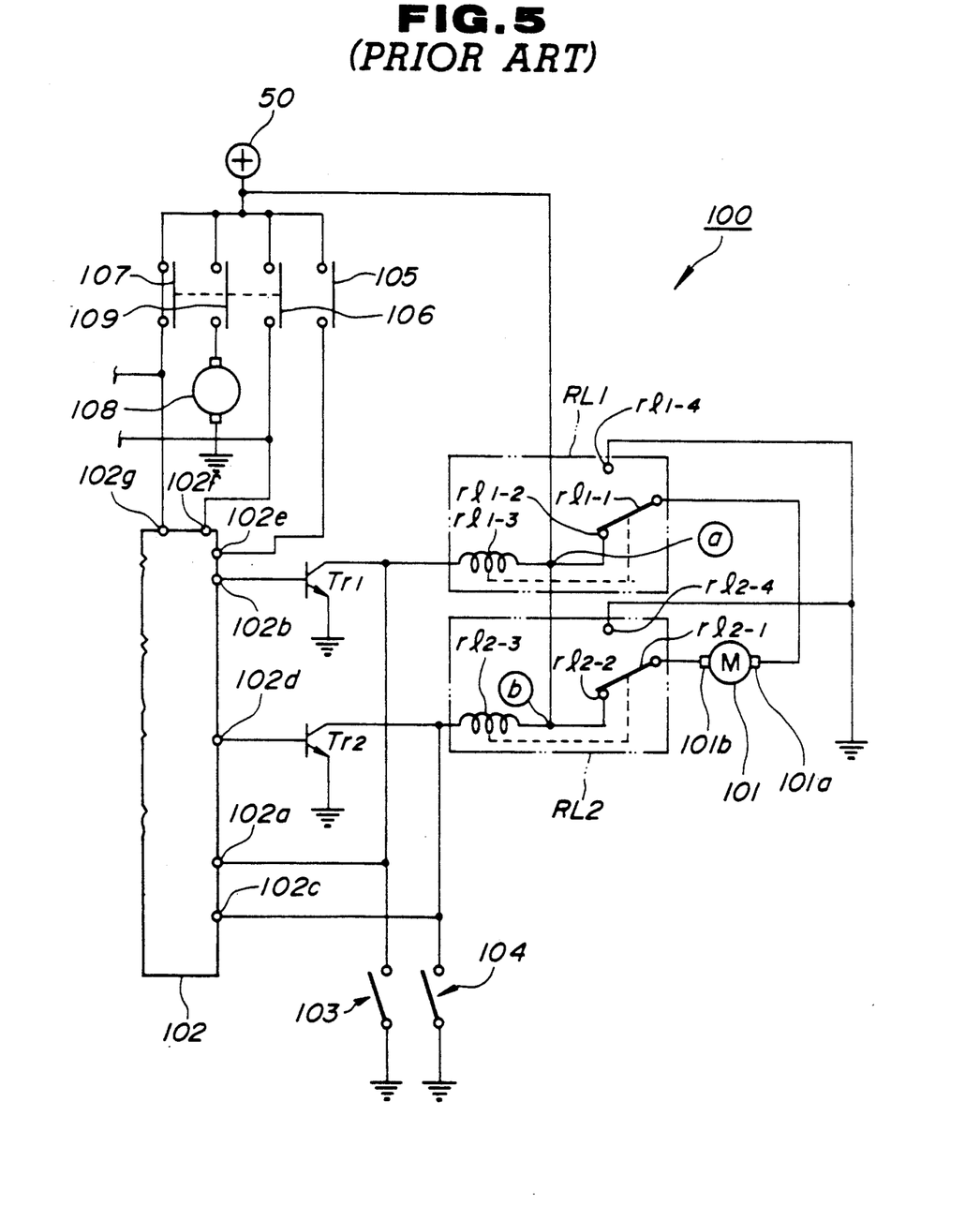
FIG. 5 is a circuit configuration of the slide-motor of the conventional drive positioning apparatus.
Figure 6A:
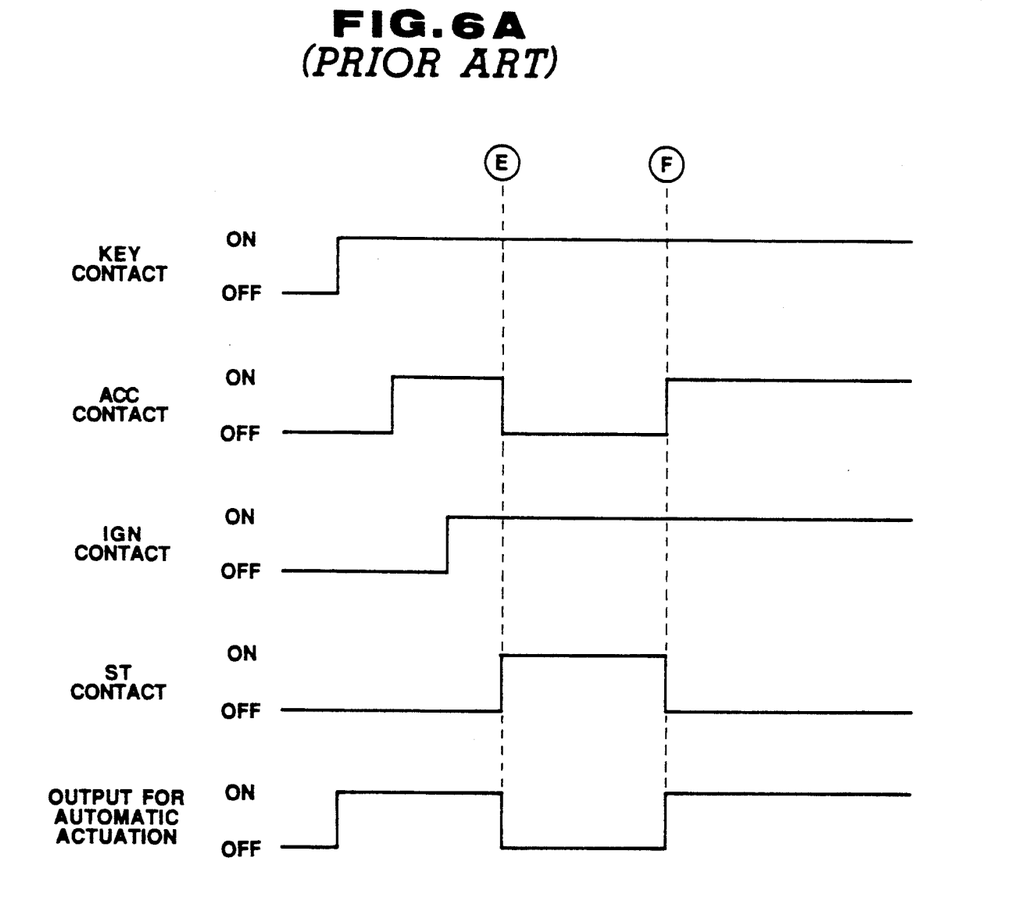
FIGS. 6A and 6B are time charts illustrating the control in the normal and abnormal states of the conventional drive positioning apparatus respectively.
Figure 6B:
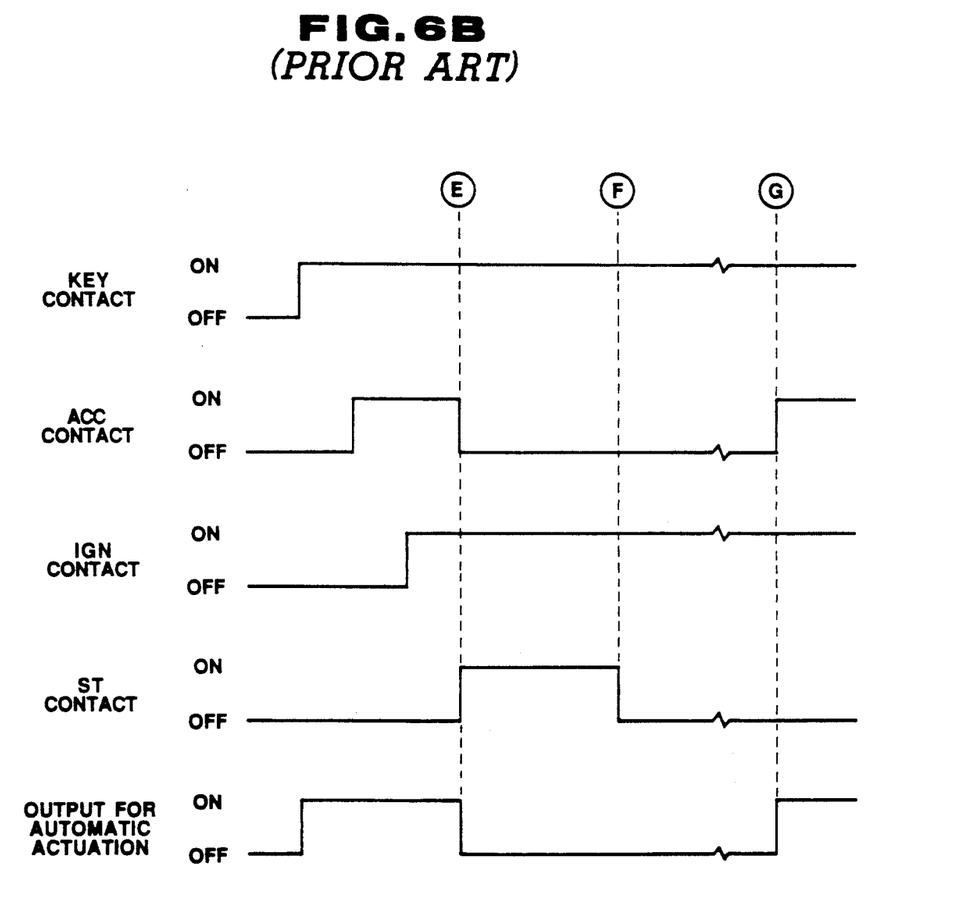

Heretofore, there has been used a drive positioning apparatus as shown in FIG. 5 and FIG. 6, for example.

Namely, the drive positioning apparatus 100 is provided with a lift-motor for driving the seat up or down, a recliner-motor for adjusting a reclining angle of a seat back of the seat and the like in addition to a slide-motor 101 for sliding the seat in a front or rear direction, however the slide-motor 101 is only shown in FIG. 5 on behalf of the aforementioned motors since they have the same circuit configuration as that of the slide-motor 101.

A power terminal 101a of the slide-motor 101 is connected with a travelling contact rl1-1 of a relay RL1, and a normal-close side fixed contact rl1-2 of the relay RL1 is connected with a power source 50 and a relay coil rl1-3 of the relay RL1 through a node ⓐ.

The relay coil rl1-3 is connected to the collector of a transistor Tr1, a manual switch port 102a of a controller 102 and a front-slide manual switch 103, and a normal-open side fixed contact rl1-4 of the relay RL1 is grounded.

The emitter of the transistor Tr1 is grounded, and the base of the transistor Tr1 is connected to an output port 102b of the controller 102.

Another power terminal 101b of the slide-motor 101 is connected with a travelling contact rl2-1 of a relay RL2, and a normal-close side fixed contact rl2-2 of the relay RL2 is connected with a relay coil rl2-3 of the relay RL2 through a node ⓑ connected to the node ⓐ.

The relay coil rl2-3 is connected to the collector of a transistor Tr2, a manual switch port 102c of a controller 102 and a rear-slide manual switch 104, and a normal-open side fixed contact rl2-4 of the relay RL2 is grounded.

The emitter of the transistor Tr2 is grounded, and the base of the transistor Tr2 is connected to an output port 102d of the controller 102.

The controller 102 is provided with a microcomputer in which signals are input from a switch board (not shown) through an I/O interface circuit, and ports 102e, 102f and 102g connected with a key switch 105 for detecting insertion and extraction of an ignition key (not shown), an accessory switch 106 for supplying electric power to respective electrical equipment including this drive positioning apparatus and an ignition switch 107 for supplying electric power to a spark plug of an engine, respectively.

The ignition switch 107 is equipped with a start switch 109 for actuating a starter motor 108 in order to start the engine, and the accessory switch 106 is so structured as to be changed into its OFF-state while the start switch 109 is in its ON-state interlockingly in order to make easy to start the engine by cutting off the power supply to the electrical equipment inclusive of the slide-motor 101 and other motors of this drive positioning apparatus and thereby lightening load of the battery (power source 50).

In a case of shifting the position of the seat into a position suitable for the driver by a hand operation, the front slide manual switch 103 or the rear-slide manual switch 104 disposed on the switch board is switched on, thereby changing the travelling contact rl1-1 of the relay RL1 into the normal open side fixed contact rl1-4 from the normal-close side fixed contact rl1-2, or the travelling contact rl2-1 of the relay RL2 into the normal open side fixed contact rl2-4 from the normal-closed side fixed contact rl2-2. Consequently, an electric current flows to the power terminal 101a from the power terminal 101b of the slide-motor 101, or flows to the power terminal 101b from the power terminal 101a of the slide-motor 101, and the slide-motor 101 rotates in the forward or reverse direction during the operation of the front-slide manual switch 103 or the rear-slide manual switch 104, so that the seat is driven in the front or rear direction slidingly.

In a case of memorizing the seat position suitable for the driver, the front-slide manual switch 103 or the rear-side manual switch 104 is changed on, thereby rotating the slide-motor 101 in the forward or reverse direction and driving the seat into the suitable position for the driver, and then the slide-motor 101 is stopped by changing off the manual switch 103 or 104. A set switch on the switch board is operated preparatively.

Subsequently, by a setting operation of a memory switch disposed on the switch board in this state, the microcomputer detects the positional displacement of the seat by counting the number of rotations (pulses) of the slide-motor 101 until the seat arrives at the present position, and the present seat position is stored in the microcomputer as the number of the rotations of the slide motor 101.

After this, it is possible to drive the slide-motor 101 automatically until the seat arrives to the suitable seat position memorized in the microcomputer according to a signal output from the output port 102b or 102d of the microcomputer by only a positioning operation of the memory switch on the switch board.

When the start switch 109 is turned on at time Ⓔ in order to start the engine while the slide motor 101 is being actuated automatically in response to the positioning operation as shown in FIG. 6A, the accessory switch 106 is designed so as to be changed interlockingly into the OFF-state for a time as long as the amount of time the start switch 109 is continued to be turned on, and the automatic actuation of the slide-motor 101 is suspended temporarily in order to lighten the load of the battery and make easy to start the engine. When the start switch 109 is turned off at time Ⓕ and the accessory switch 106 returns to the ON-state interlockingly, the automatic actuation of the slide-motor 101 is resumed.

However, in the aforementioned conventional drive positioning apparatus 100, when the accessory switch 106 becomes impossible to return into the ON-state by some failure, such as a contact fault, the slide-motor 101 is kept in the state in which its automatic actuation is suspended in spite of turning off the start switch 109 at time Ⓕ after turning on it at time Ⓔ as shown in FIG. 6B. Accordingly, there is a problem in that the seat begins unexpectedly to move toward the memorized seat position if the accessory switch 106 returns to its ON-state at time Ⓖ by some reason, such as vibration from the engine.

SUMMARY OF THE INVENTION

The present invention, therefore, is directed to solve the above-mentioned problem of the prior art. It is an object to provide a drive positioning apparatus which is so designed that the seat or the steering wheel may not begin to move unexpectedly even if the accessory switch has abnormality such as a contact fault.

The construction of the drive positioning apparatus according to this invention in order to accomplish the above-mentioned object is characterized by comprising at least one motor for driving a seat or a steering wheel shaft, a preset memory means for storing operating data of the motor in response to a preset operation, a memory drive means for actuating the motor automatically according to the operating data stored in the preset memory means, a hand operation means for manually actuating the motor, an ignition switch operable by turning an ignition key inserted thereinto which is provided with a KEY contact for detecting insertion of the ignition key, an ACC contact for supplying electric power to respective electrical equipment, an IGN contact for supplying electric power to a spark plug of an engine and an ST contact for actuating a starter motor in order to start the engine, and which is so structured as to change the ACC contact into its OFF-state interlockingly by turning the ST contact into its ON-state, and a control means for prohibiting the automatic actuation of the motor by the memory drive means in a case in which the ACC contact is changed into the OFF state while the motor is being actuated by the memory drive means, and remains in the OFF-state for predetermined time.

In the drive positioning apparatus according to this invention, the control means prohibits the motor or motors to be actuated automatically by the memory drive means if the ACC contact is changed off while the motor or motors are being actuated automatically by the memory drive means and the ACC contact remains in the OFF-state for predetermined time. Therefore, according to this invention, the seat or the steering wheel never begins to move unexpectedly after the suspension of the automatic driving at the time of starting the engine even if the ACC contact breaks down and then recovers the ON-state from one cause or another.

DESCRIPTION OF THE PREFERRED EMBODIMENT

A drive positioning apparatus according to an embodiment of this invention will be explained below on the basis of FIG. 1 to FIG. 4.

Figure 1:
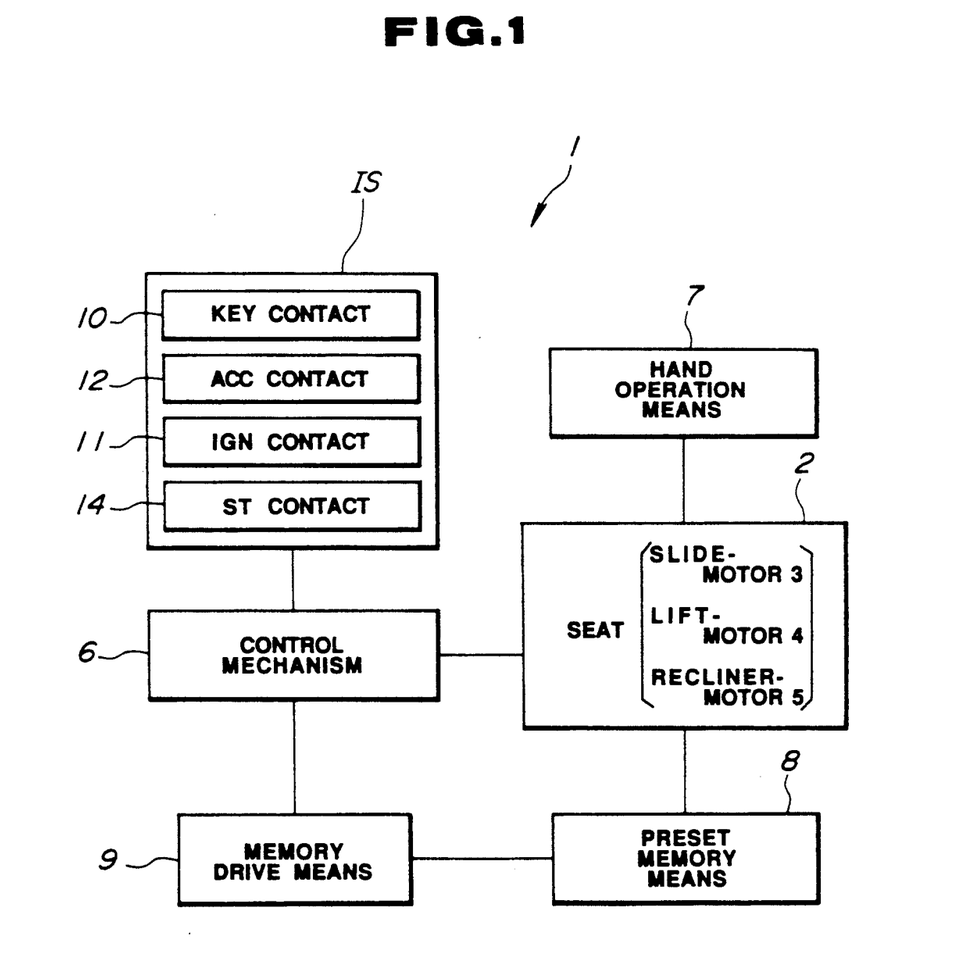
FIG. 1 is a block diagram showing the construction of the drive positioning apparatus according to an embodiment of this invention.

The drive positioning apparatus 1 shown in FIG. 1 has a seat 2 provided with a slide-motor 3 for driving the seat 2 in the front or rear direction slidingly, a lift-motor 4 for driving the seat 2 up or down, and a recliner-motor 5 for adjusting a reclining angle of a seat back of the seat 2. The respective motors 3, 4 and 5 are connected to a control mechanism 6.

The respective motors 3, 4 and 5 is connected with a hand operation means 7 for actuating the motors 3, 4 and 5 manually, and a preset memory means 8 for storing operating data of the motors 3, 4 and 5, in multiple according to the necessity, in response to a preset operation of a memory switch disposed on a switch board (not shown).

The preset memory means 8 is connected to the control mechanism 6 through a memory drive means 9 for actuating the motors 3, 4 and 5 automatically according to the operating data stored in the preset memory means 8, and the control mechanism 6 is connected with an ignition switch IS.

Figure 2:
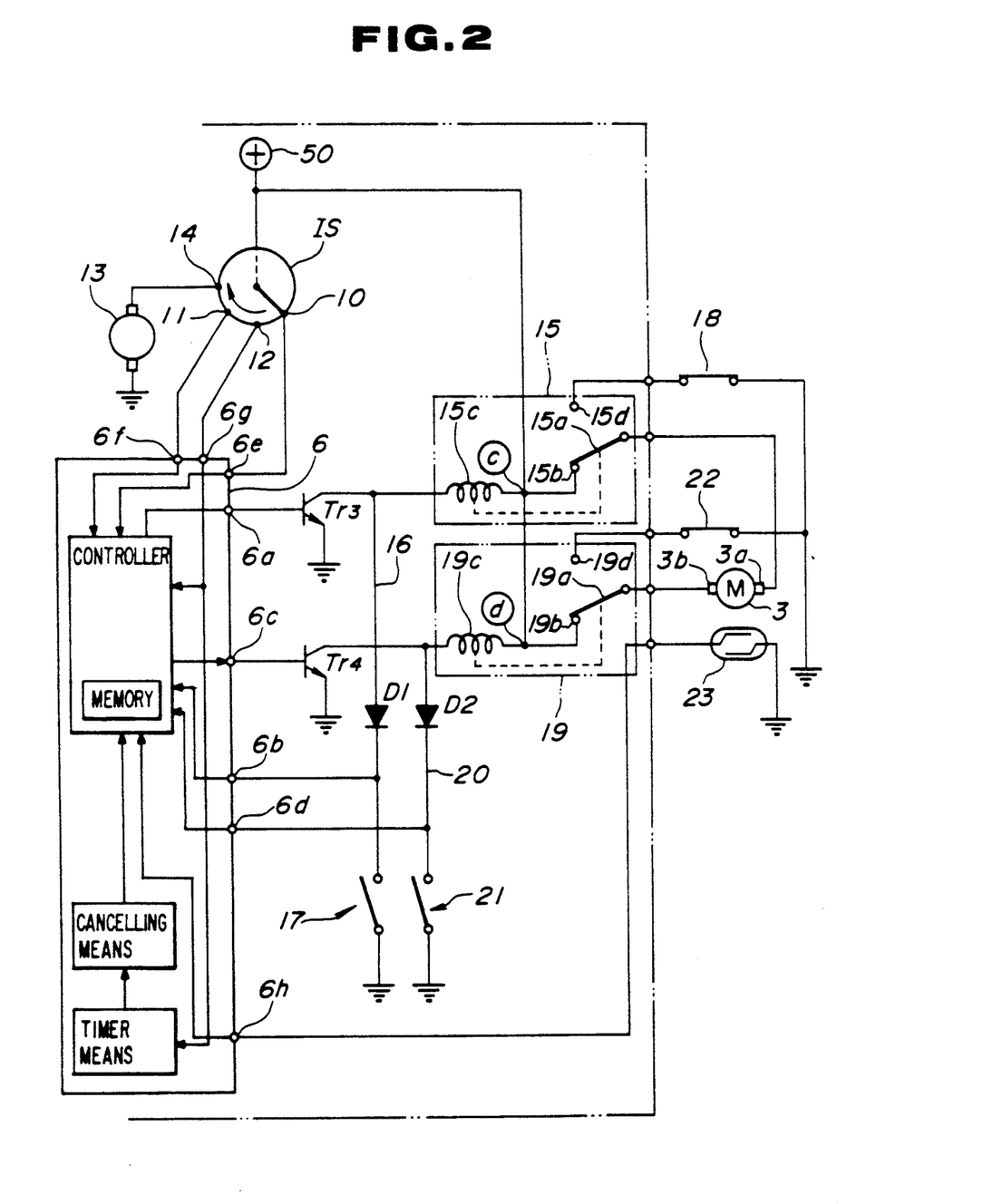
FIG. 2 is a circuit configuration of the slide-motor of the drive positioning apparatus shown in FIG. 1.

The ignition switch IS is a rotary switch to be operated by an ignition key inserted thereinto, and provided with a KEY contact 10 for detecting whether the ignition key is inserted into a key hole of the ignition switch or not, a ACC contact 12 for supplying electric power to electrical equipment mounted on the automotive vehicle, an IGN contact 11 for supplying electric power to a spark plug of an engine and an ST contact 14 for actuating a starter motor 13 shown in FIG. 2 in order to start the engine.

The ignition switch IS is designed so that the respective contacts 10, 11, 12 and 14 interlock with each other as shown in Table 1, and so structured especially as to change the ACC contact 12 into its OFF-state at the time of turning the ST contact 14 into ON-state in order to make easy to start the engine by cutting off the power supply to the electrical equipments and thereby lightening the load of a battery.

TABLE 1

| Position of Ignition Key | KEY contact | ACC contact | IGN contact | ST contact |
| --- | --- | --- | --- | --- |
| Extraction | OFF | OFF | OFF | OFF |
| Insertion | ON | OFF | OFF | OFF |
| ACC position | ON | ON | OFF | OFF |
| IGN position | ON | ON | ON | OFF |
| ST position | ON | OFF | ON | ON |

FIG. 2 is a circuit diagram illustrating a circuit configuration in the neighborhood of the slide-motor 3 among the respective motors 3, 4 and 5, the circuit diagrams of the lift-motor 4 and the recliner-motor 5 are abbreviated since they have also circuit configurations similar to that shown in FIG. 2.

A power terminal 3a of the slide-motor 3 is connected to a travelling contact 15a of a front-slide relay 15, and a normal-close side fixed contact 15b of the relay 15 is connected to a power source 50 and a relay coil 15c of the relay 15 through a node Ⓒ.

The relay coil 15c of the relay 15 is connected to a cable 16 connected with a diode D1 and the collector of a transistor Tr3 forming a part of the memory drive means 9, the emitter of the transistor Tr3 is grounded and the base of the transistor Tr3 is connected to a front-slide output port 6a of the control mechanism 6.

The cable 16 is connected to a front-slide manual input port 6b of the control mechanism 6 and a front-slide manual switch 17 (hand operation means 7) grounded, and a normal-open side fixed contact 15d of the relay 15 is grounded through a limit switch 18 which is opened when the seat 2 arrives in the forefront position.

Another power terminal 3b of the slide-motor 3 is connected with a travelling contact 19a of a rear-slide relay 19, and a normal-close side fixed contact 19b of the relay 19 is connected to the power source 50 and a relay coil 19c of the relay 19 through a node (d).

The relay coil 19c of the relay 19 is connected to a cable 20 connected with a diode D2 and the collector of a transistor Tr4 forming a part of the memory drive means 9, the emitter of the transistor Tr3 is grounded and the base of the transistor Tr3 is connected to a rear-slide output port 6c of the control mechanism 6.

The cable 20 is connected to a rear-slide manual input port 6d of the control mechanism 6 and a rear-slide manual switch 21 (hand operation means 7) grounded, and a normal-open side fixed contact 19d of the relay 19 is grounded through a limit switch 22 which is opened when the seat 2 arrives in the rearmost position.

The control mechanism 6 is provided with a suspension timer which starts its working when the ACC contact 12 is changed into the OFF-state from the ON-state in a state in which the IGN contact 11 is in the ON-state, and a KEY contact input port 6e, an IGN contact input port 6f, an ACC contact input port 6g and a rotation sensor input port 6h in addition to the aforementioned ports 6a, 6b, 6c and 6d. The KEY contact 10 is connected to the KEY contact input port 6e, the IGN contact 11 is connected to the IGN contact input port 6f, the ACC contact 12 is connected to the ACC contact input port 6g and the rotation sensor input port 6h is connected with a rotation sensor 23 for counting the number of the rotations of the slide-motor 3. The control mechanism 6 is so designed as to be input with a signal from a preset memory means 8 and to output a signal for driving the slide-motor 3 according to the operating data stored in the preset memory means 8 through an I/O interface circuit (not shown).

In the case of moving the seat 2 into a position suitable for the driver by a manual operation, the front-slide manual switch 17 or the rear-slide manual switch 21 disposed on the switch board is switched on, thereby actuating the front-slide relay 15 or the rear-slide relay 19 and the slide-motor 3 is rotated in the forward or reverse direction. Then, the front-slide manual switch 17 or the rear-slide manual switch 21 is changed off when the seat 2 arrives to the position suitable for the driver.

In the case of memorizing the seat position suitable for the driver in the preset memory means 8, the front-slide manual switch 17 or the rear-slide manual switch 21 is changed on, thereby rotating the slide-motor 3 in the forward or reverse direction and driving the seat 2. The slider-motor 3 is stopped by changing off the manual switch 17 or 21 when the seat 2 arrives at the seat position suitable for the driver. A set switch disposed on the switch board is operated in this state.

Subsequently to the operation of the set switch, by the setting operation of a memory switch on the switch board, a microcomputer in the control mechanism 6 counts the number of rotations of the slide-motor 3 according to pulses output from the rotation sensor 23, and the aforementioned number of rotations is stored in the preset memory means 8 as a positional displacement of the seat 2.

After this, by the positioning operation of the memory switch on the switch board, the control mechanism 6 outputs a signal to the transistor Tr3 or Tr4 through the front-slide output port 6a or the rear-slide output port 6c according to the positional displacement memorized in the preset memory means 8, and actuates the front-slide relay 15 or the rear-slide relay 19. Thus, the slide-motor 3 is rotated automatically in the forward or reverse direction until the seat 2 arrives to the memorized seat position suitable for the driver.

Figure 3:
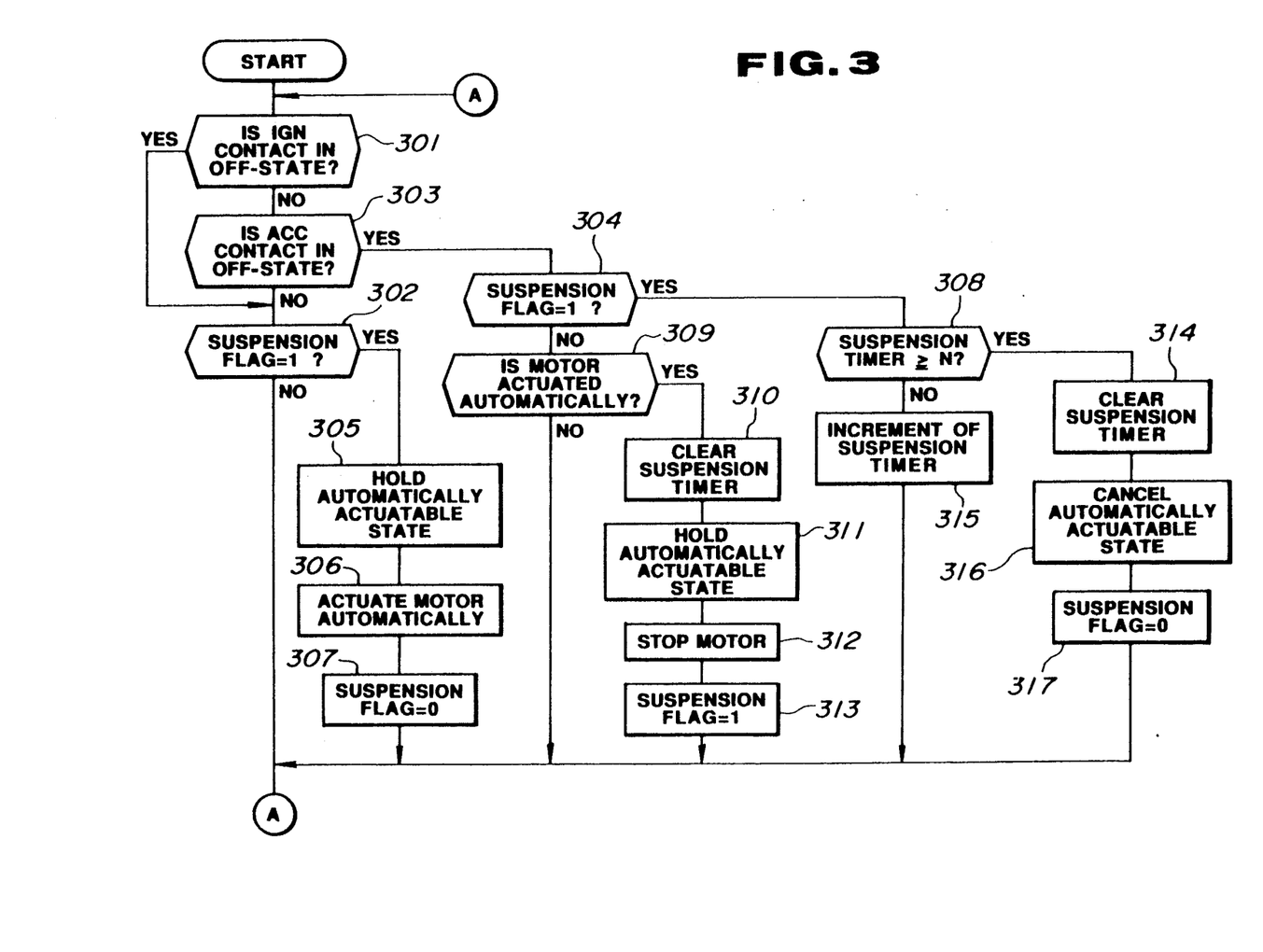
FIG. 3 is a flow chart explaining control in the drive positioning apparatus shown in FIG. 1.

Furthermore, in the drive positioning apparatus 1, the control mechanism 6 executes following control in accordance with the flow chart shown in FIG. 3, and controls the slide-motor 3 (inclusive of the other motors 4 and 5) so that the automatic actuation of the slide-motor 3 may be suspended in order to make easy to start the engine when the starter motor 13 is actuated by switching on the ST contact 14 of the ignition switch IS while the slide-motor 3 is actuated automatically by the memory drive means 9, and the automatic actuation of the slide-motor 3 may not be restarted even if the ACC contact 12 of the ignition switch IS recovers the ON-state after once breaking down.

Namely, the control is started by inserting the ignition key into the key hole of the ignition switch IS, and judgement is done as to whether the IGN contact 11 of the ignition switch IS is in the OFF-state or not at step 301.

In step 301, if the IGN contact 11 is in the OFF-state (YES), control proceeds to step 302, and when the IGN contact 11 is not in the OFF-state (NO), control proceeds to step 303. Judgement is done as to whether the ACC contact 12 of the ignition switch IS is in the OFF-state or not at step 303. If the ACC contact 12 is not in the OFF-state (NO) at step 303, control proceeds to step 302.

Although judgement is done as to whether or not a suspension flag is "1", which indicates that the automatic actuation of the slide-motor 3 by memory drive means is suspended at present, control return to step 301 since the suspension flag is not set as yet. The judgements in steps 301, 302 and 303 are repeated until the IGN contact 11 is changed on and the ACC contact 12 is switched off at step 301 and step 303.

Namely, the control mechanism 6 determines that the ST contact 14 of the ignition switch IS is not turned into its ON-state as yet when the IGN contact 11 is in the OFF-state, or the IGN contact 11 and the ACC contact 12 are in the ON-states equally.

When the judgement is done at step 303 that the ACC contact 12 is in the OFF-state (YES), control proceeds to step 304 and judgement is done as to whether the suspension flag is "1" or not. Control proceeds to succeeding step 309 because the suspension flag is not set as yet also in this step.

In step 309, confirmation is done as to whether the slide-motor 3 is being actuated automatically by the memory drive means 9 or not. If the slide-motor 3 is not being actuated automatically (NO) at step 309, control returns to step 301 without executing any process.

When the slide-motor 3 is being actuated automatically by the memory drive means 9 (YES) at step 309, control proceeds to step 310 and a suspension timer is cleared in this step. The slide-motor 3 is stopped at step 312 after holding the automatically actuatable state of the slide-motor 3 at step 311. Furthermore, control returns to step 301 after setting the suspension flag into "1" at step 313.

Namely, the control mechanism 6 determines that the ST contact 14 of the ignition switch IS is switched on and thereby actuating the starter motor 13 in order to start the engine by detecting the IGN contact 11 to be in the ON-state and the ACC contact 12 to be changed off. According to this determination, the control mechanism 6 suspends the automatic actuation of the slide-motor 3 in order to lighten the load of the battery and make easier to start the engine by cutting off the power supply to the slide-motor 3 as well as the other electrical equipment mounted on the automotive vehicle. (The power supply to the other electrical equipments has been cut off already at the same time of changing off the ACC contact 12.)

Judgement is done that the IGN contact 11 is not in the OFF-state (NO), and the ACC contact 12 is in the OFF-state (YES) at step 301 and step 303 respectively as long as the ST contact 14 of the ignition switch IS in the ON-state and the starter motor 13 continues to rotate, and control proceeds to step 304.

In step 304, judgement is done that the suspension flag is "1" (YES) and control proceeds to step 308 in this time since the suspension flag has been set at step 313.

In step 308, judgement is done as to whether the number of counts of the suspension timer reaches predetermined value N or not, that is whether or not predetermined time t1 elapses after the ACC contact 12 of the ignition switch IS changes to the OFF-state from the ON-state. Judgement is done at step 308 that the number of counts of the timer does not reach the value N (NO) because the suspension timer has been cleared at step 310, and control returns to step 301 after increment of the suspension timer at step 315. The increment of the suspension timer is repeated until the ACC-contact 12 changes to the ON-state or the number of counts reaches to the predetermined value N.

On an ordinary occasion, the ACC-contact 12 changes to the ON-state before the number of counts of the suspension timer reaches the predetermined value N, that is, before the lapse of the predetermined time t1.

When judgement is done at step 303 that the ACC contact 12 is not in OFF-state (NO), control proceeds to step 302 and judgement is done as to whether the suspension flag is "1" or not. Control proceeds to step 305 by judging that the suspension flag is "1" (YES) at step 302 since the suspension flag has been set at step 313.

In step 305, the automatically actuatable state of the slide-motor 3 is held and control proceeds to step 306.

In step 306, the slide-motor 3 is actuated again by the memory drive means 9, and control returns to step 301 after clearing the suspension flag at step 307.

Namely, the control means 6 determines that the actuation of the starter motor 13 (engine cranking) has been finished by detecting the ACC contact 12 to be changed on at step 303, and restarts to drive the seat 2 into the memorized seat position suitable for the driver by actuating the slide-motor 3 automatically according to the stored operating data in the preset memory means 8.

If the predetermined time t1 elapses before the ACC contact 12 changes to the ON-state, judgement is done at step 308 that the number of counts of the suspension timer reaches the predetermined value N (YES) and control proceeds to step 316 after clearing the suspension timer at step 314.

In the step 316, the automatically operable state of the slide-motor 3 is cancelled, and then control returns to step 301 after clearing the suspension flag at step 317.

Namely, in the case in which the ACC contact 12 of the ignition switch IS does not change to the ON-state until the predetermined time t1 elapses, the control mechanism 6 determines that some failure occurs in the ACC contact 12, and cancels the automatically actuatable state of the slide-motor 3 on bases of this determination so that the seat 2 may not move again unexpectedly even if the ACC-contact 12 recovers the OFF-state by some reason.

Figure 4:
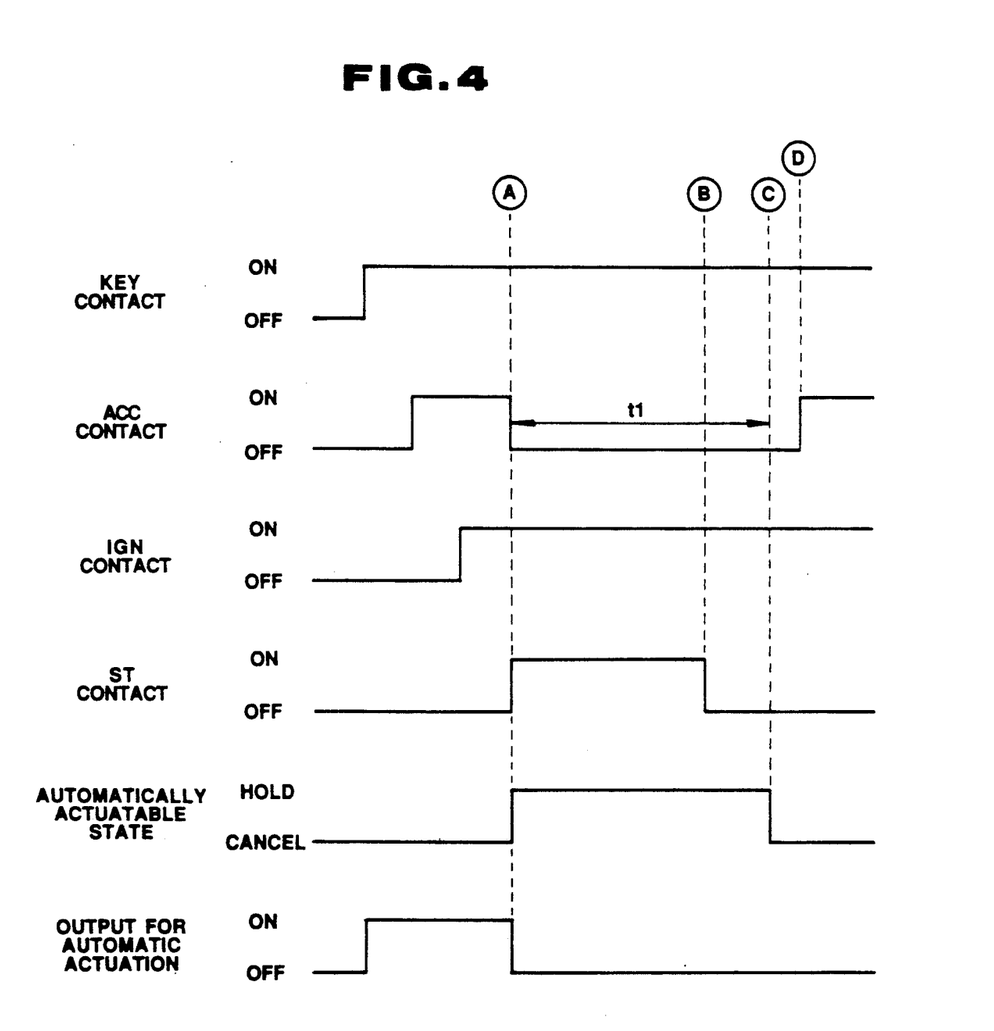
FIG. 4 is a time chart illustrating the timing of the control in the drive positioning apparatus shown in FIG. 1.

As shown in FIG. 4, in the drive positioning apparatus 1, when the ST contact 14 of the ignition switch IS is turned on at time (A) in order to start the engine at the state in which the KEY contact, the ACC contact 12 and the IGN contact 11 are in the ON-states equally, the ACC contact changes interlockingly to the OFF-state and thereby suspending the automatic actuation of the slide-motor 3 under the condition in which the automatically actuatable state of the slide-motor 3 is maintained.

If the ACC contact 12 does not change into the OFF-state in spite of finishing the starting of the engine and turning off the ST contact 14 at time (B), the control mechanism 6 determines that some failure arises in the ACC contact 12, and cancels the automatically actuatable state of the slide-motor 3 at time (C) when the predetermined time t1 elapses after the time (A). Accordingly, the seat 2 never moves again unexpectedly even if the ACC contact 12 recovers the ON-state at time (D) by, for example, vibration from engine because the automatically actuatable state of the slide-motor 3 has been cancelled at time (C).

Under ordinary circumstances, there is no doubt that the ACC contact 12 of the ignition switch IS changes to the OFF-state interlockingly when the ST contact 14 is turned off, and the seat 2 starts again toward the memorized seat position at the time (B) since the automatically actuatable state of the slide-motor 3 is maintained.

As explained above, in the drive positioning apparatus according to this invention which has the aforementioned construction, the control means is so designed as to prohibit the automatic actuation of the motor in a case in which the ACC contact of the ignition switch in changed into the OFF-state while the motor is being actuated automatically by the memory drive means, and the ACC contact remains in the OFF-state as long as predetermined time. Therefore, an excellent effect can be obtained in that the seat or the steering wheel never begins to move unexpectedly after the suspension of the automatic driving at the time of starting the engine even if the ACC contact of the ignition switch breaks down by some cause and recovers afterwards by some chance such as vibration from the engine and thereby supplying the electric power to the other electrical equipment mounted on the automotive vehicle.

What is claimed is:

1. A memory drive positioning apparatus for controlling the attitude of a device mounted on a vehicle having an engine and a starter motor for starting the engine, the apparatus comprising:

actuating means for actuating the vehicle mounted device;

driving means connected to said actuating means for energizing said actuating means;

key switch means changeable between at least four states including an OFF state, a first ON state to detect a key in said key switch means, a second ON state to actuate said actuating means and a third ON state to energize the starter motor for starting the engine; and controlling means connected to said actuating means through said driving means and said key switch means for controlling said actuating means and having memory means for memorizing predetermined position data and means for automatically driving said actuating means to move the vehicle mounted device to a position in accordance with the memorized position data in the memory means when said key switch means is in the second ON state, whereby said controlling means temporarily stops energizing said actuating means while said key switch means is switched from the second ON state to the third ON state and said controlling means restarts to energize said actuating means when said key switch means is returned to the second ON state from the third ON state;

wherein said controlling means further comprises:

timer means for clocking a time duration after said key switch means is switched from the second ON state to the third ON state, and cancelling means connected with said timer means for cancelling the restart of said actuating means when said time duration of said timer means reaches a predetermined time duration.

2. The apparatus in accordance with claim 1, wherein said actuating means comprises an electric reversible motor and said driving means comprises a pair of relays connected with said reversible motor and a pair of switching transistors connected with said relays.

3. The apparatus in accordance with claim 2, wherein said driving means further comprises a pair of manual switches connected in parallel with said transistors.

4. A memory drive positioning apparatus for controlling the attitude of a device mounted on a vehicle having an engine and a starter motor for starting the engine, the apparatus comprising:

actuating means for actuating the vehicle mounted device;

driving means connected to said actuating means for energizing said actuating means;

key switch means changeable between at least four states including an OFF state, a first ON state to detect a key in said key switch means, a second ON state to actuate said actuating means and a third ON state to energize the starter motor for starting the engine; and controlling means connected to said actuating means through said driving means and said key switch means for controlling said actuating means and having memory means for memorizing predetermined position data and means for automatically driving said actuating means to move the vehicle mounted device to a position in accordance with the memorized position data in the memory means when said key switch means is in the second ON state, stopping means for temporarily stopping said actuating means while said key switch means is in the third ON state and restarting means for restarting said actuating means when said key switch means is returned to the second ON state from the third ON state;

wherein said controlling means further comprises:

timer means for clocking a time duration after said key switch means is switched from the second ON state to the third ON state, and cancelling means connected with said timer means for cancelling the restart of said actuating means when said time duration of said timer means reaches a predetermined time duration.

5. The apparatus in accordance with claim 4, wherein said actuating means comprises an electric reversible motor and said driving means comprises a pair of relays connected with said reversible motor and a pair of switching transistors connected with said relays.

6. The apparatus in accordance with claim 5, wherein said driving means further comprises a pair of manual switches connected in parallel with said transistors.

* * * * *